United States Patent
Landwehr

(10) Patent No.: US 11,219,978 B2
(45) Date of Patent: Jan. 11, 2022

(54) UTILITY KNIFE WITH A REPLACEMENT BLADE AND A SYSTEM AND METHOD FOR DETERMINING THE END OF LIFE OF THE BLADE

(71) Applicant: Thomas Jay Landwehr, DePere, WI (US)

(72) Inventor: Thomas Jay Landwehr, DePere, WI (US)

(73) Assignee: RITESAFETY PRODUCTS INT'L, LLC, DePere, WI (US)

( * ) Notice: Subject to any disclaimer, the term of this patent is extended or adjusted under 35 U.S.C. 154(b) by 94 days.

(21) Appl. No.: 16/801,238

(22) Filed: Feb. 26, 2020

(65) Prior Publication Data

US 2021/0260777 A1    Aug. 26, 2021

(51) Int. Cl.
| | |
|---|---|
| *B23Q 17/09* | (2006.01) |
| *B23Q 17/24* | (2006.01) |
| *B26B 1/08* | (2006.01) |
| *B26B 27/00* | (2006.01) |

(52) U.S. Cl.
CPC ....... *B23Q 17/099* (2013.01); *B23Q 17/2452* (2013.01); *B26B 1/08* (2013.01); *B26B 27/00* (2013.01)

(58) Field of Classification Search
CPC .... B23Q 17/099; B23Q 17/2452; B26B 1/08; B26B 27/00
See application file for complete search history.

(56) References Cited

U.S. PATENT DOCUMENTS

| | | | | |
|---|---|---|---|---|
| 4,120,196 A | * | 10/1978 | Hamilton | G01N 3/58 33/558 |
| 5,921,726 A | * | 7/1999 | Shiozaki | B23Q 17/0957 408/6 |
| 2004/0029491 A1 | * | 2/2004 | Hubbell | B28D 5/0064 451/11 |
| 2008/0254404 A1 | * | 10/2008 | Heraud | A61C 1/0007 433/27 |
| 2016/0091393 A1 | * | 3/2016 | Liao | B23Q 17/0995 702/34 |
| 2016/0167241 A1 | * | 6/2016 | Goldfarb | B26B 21/28 382/108 |
| 2017/0067229 A1 | * | 3/2017 | Stock | E02F 9/2054 |
| 2017/0361474 A1 | * | 12/2017 | Landwehr | G08B 21/182 |
| 2018/0085878 A1 | * | 3/2018 | Agudelo | G05B 23/0275 |
| 2018/0126509 A1 | * | 5/2018 | Pereira | B23Q 5/32 |
| 2018/0272491 A1 | * | 9/2018 | Yang | B23Q 17/2457 |
| 2019/0258222 A1 | * | 8/2019 | Karandikar | G05B 19/404 |
| 2021/0047807 A1 | * | 2/2021 | Gray | F15B 19/005 |

\* cited by examiner

*Primary Examiner* — Gary Collins
(74) *Attorney, Agent, or Firm* — Donald Ersler

(57) ABSTRACT

Utility knife with a replaceable blade and a system and method for determining the End of Life of the blade comprising one or more sensors for detecting blade use, a communication unit adapted to establish a wireless connection to a computer cloud network and to send and receive information via wireless transmission to be stored and processed by a control system with a control CPU and a control memory, the information being a series of values recorded by said sensor by time, stored in the control memory as data sets using machine learning or artificial intelligence for determining common or similar values of recorded parameters in the stored data sets or of values calculated from these parameters according to a predefined logic, for use as reference values indicating the End of Life of the blade.

15 Claims, 7 Drawing Sheets

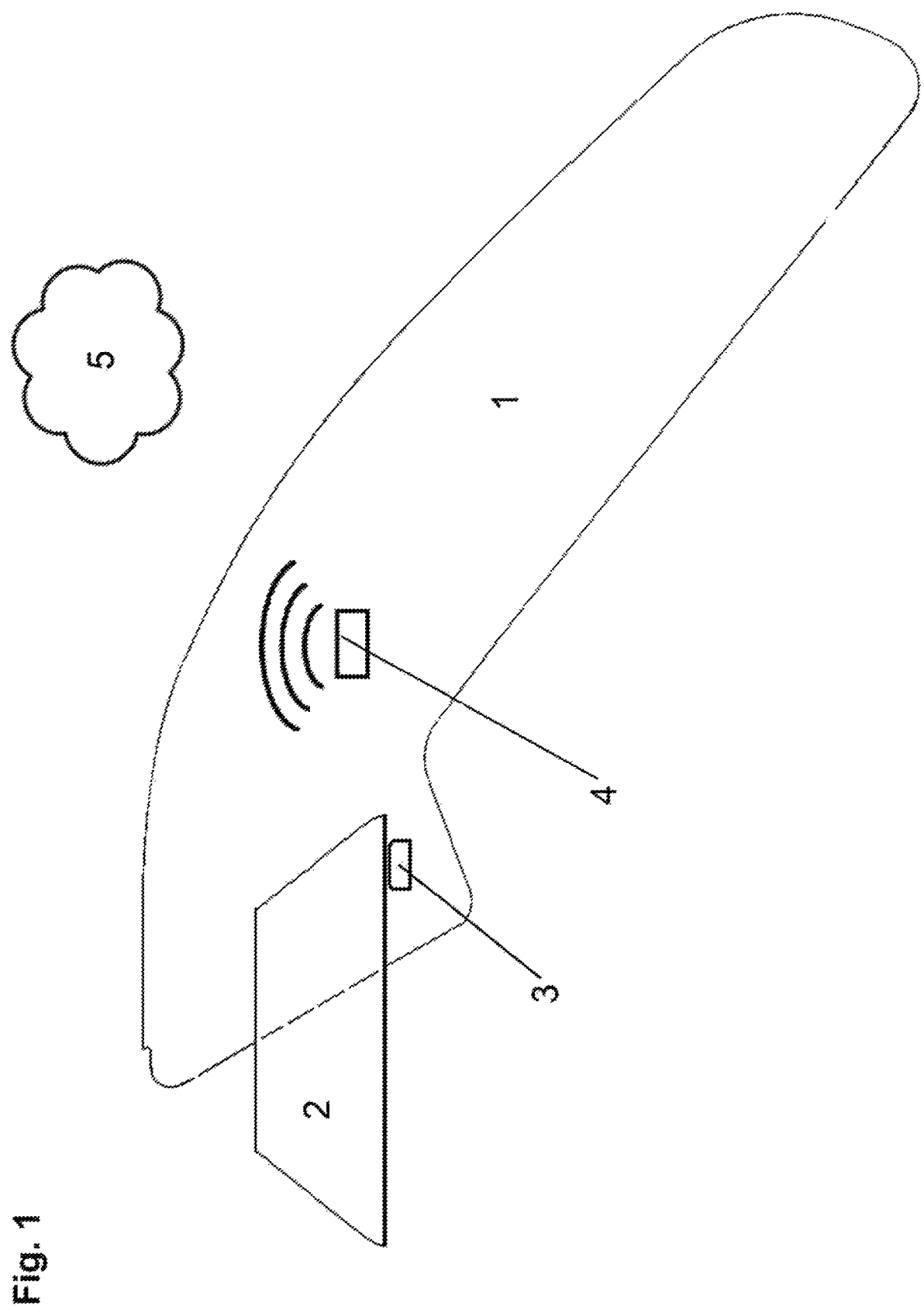

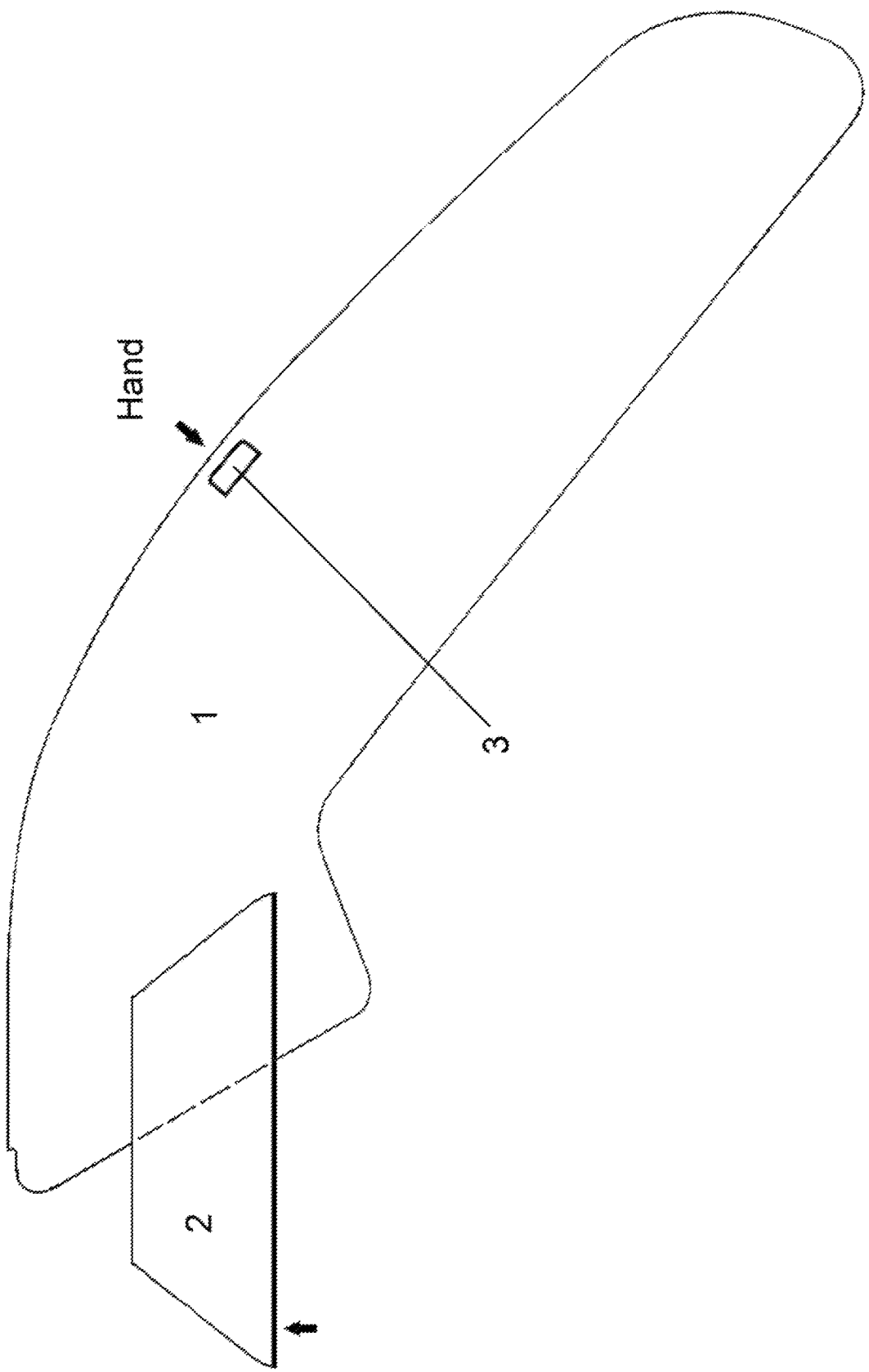

UTILITY KNIFE WITH A REPLACEMENT BLADE AND A SYSTEM AND METHOD FOR DETERMINING THE END OF LIFE OF THE BLADE

FIELD OF THE INVENTION

The present invention relates to a utility knife with a replaceable blade and a system and method for determining the End of Life of the blade.

BACKGROUND OF THE INVENTION

In many industries utility knives are used for cutting various materials. Determination of the correct time to replace a blade is usually left up to the user, as there is no rule or useful parameter which can be applied generally. Many factors have an influence on the useful lifetime (End of Life) of a blade, such as the involved materials, the working environment and the technique used for cutting.

If a blade is used beyond its useful lifetime, because it becomes dull or is impaired in another manner, it can cause disappointing results such as lacerations or even lead to injuries of the user. For example, some users make thousands of cuts a day, which can easily lead to repetitive motion injuries if the used blade is not sharp enough. A dull blade can also lead the user to apply a larger force, which increases the risk of both cutting injuries as well as muscle injuries.

Over the last 20 years, the questions "how long does a blade last?", "when should the blade be changed?" has remained unanswered, mainly due to the fact that the answer is different for different applications, environments and sometimes even up to the individual user.

SUMMARY OF THE INVENTION

The main object of the present invention is to provide a utility knife with a means for collecting the usage information of a replaceable blade, allowing the empirical determination of the End of Life of the blade, while also providing the option to be able to inform the user when the blade should be replaced due to the historically collected usage information.

Another object of the present invention is to provide a system allowing the utility knife to communicate with a control system to collect historical usage information.

Another object of the present invention is to provide a method allowing the control system to use the collected historical usage information for analysis and empirical determination of a reference value to be used by the utility knife for indicating the End of Life of the replaceable blade.

The following description and the accompanying drawings show exemplary embodiments of the invention. The invention, however, should not be interpreted as being limited to these particular embodiments. Variations of the embodiments can be made by those skilled in the art without departing from the scope of this invention as defined by the claims.

BRIEF DESCRIPTION OF THE DRAWINGS

FIG. 1 Utility knife with sensor and communication unit
FIG. 2a Utility knife with pressure sensor and pivoting blade
FIG. 2b Utility knife with pressure sensor
FIG. 2c Utility knife with pressure sensor for users hand
FIG. 3 Force vs time graph for multiple cuts of different materials
FIG. 4 Utility knife with an indicator
FIG. 5a Utility knife with a damping device for the pressure sensor 3
FIG. 5b Utility knife with a bulge limiting the movement of the blade towards the pressure sensor
FIG. 6 Integrated force vs. time graph

DETAILED DESCRIPTION OF THE INVENTION

Figure 2B:
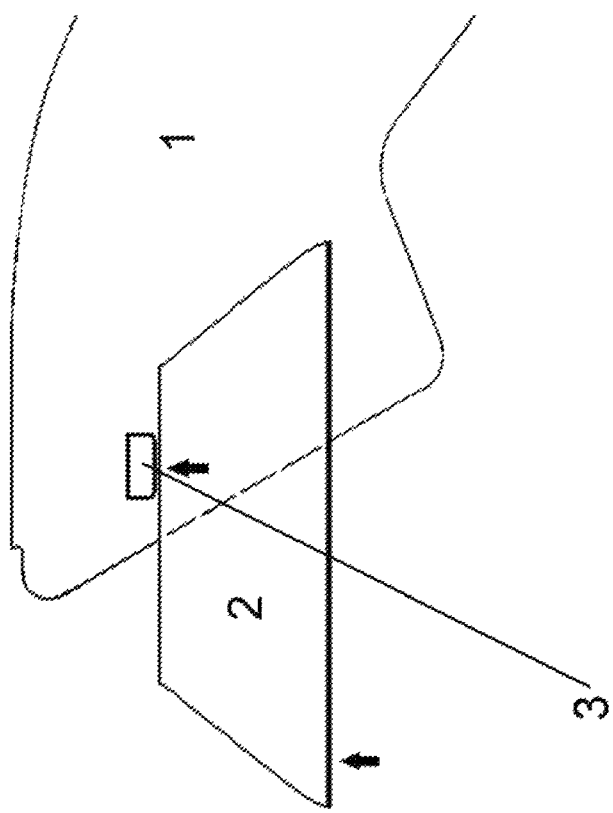
Figure 2A:
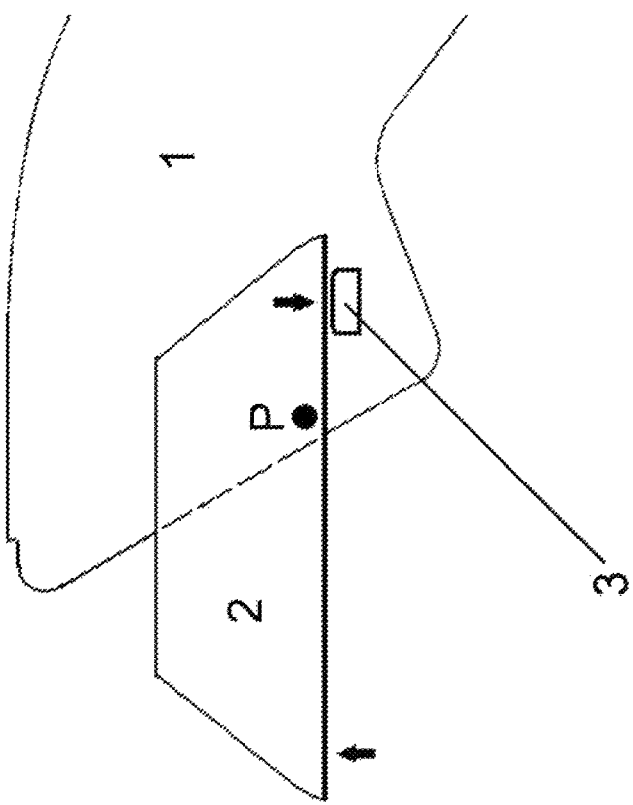

FIG. 1 shows a utility knife 1 with a replaceable blade 2, a sensor 3 for detecting blade use, and a communication unit 4 for communicating with a computer cloud network 5 for sending and receiving information via wireless transmission. In a preferred embodiment, the sensor 3 for detecting the blade use is connected to or in close proximity to the blade, allowing it to detect movement or changes to physical properties of the blade. The sensor 3 can be a pressure sensor 3, an electrical contact, a temperature sensor 3, a strain gauge or any other type of sensor 3 suitable to record a physical parameter of the blade that can be associated with the use of the blade. In another embodiment the sensor 3 can be located at any position of the utility knife 1. Besides the mentioned types of sensors in this embodiment of the utility knife 1 it can also include acceleration sensors, vibration sensors, gyroscopes, microphones or cameras. Depending on the type of sensor 3, these could be arranged to allow recording a physical parameter directly or indirectly related to the use of the blade. Examples of sensors and the corresponding measured values related to the use of the blade are given here:

A pressure sensor 3 can be connected to the blade as shown in FIGS. 2a and 2b allowing the force applied to the blade to be measured.

In another embodiment, the pressure sensor 3 could also be located on or in the housing of the utility knife 1 for recording the force applied by the users hand when pulling or pushing the knife during the cutting process (FIG. 2c). Using a pressure sensor 3 allows collection of the force applied both in quantity and over time.

An electrical contact can be useful for determining an action such as removal of the blade. The contact could be interrupted as soon as the blade is removed or a trigger on the utility knife 1 is pushed to enable the removal of the blade. This trigger could be used for extending the blade from inside the housing or retracting a blade protection to expose the blade. The configuration could also be such that the use and/or the determination of the time of use for a cut is recorded if the electrical contact is active or not. This can be achieved by placing the electrical contact such that the contact is de-/activated as soon as the blade is slightly moved from its initial position by the contact with the material to be cut.

In circumstances where cutting through an object is met with high resistance, this can lead to an increase in temperature of the blade, enabling a temperature sensor 3 to record the duration and possibly also the resistance during the cut which may be proportional to the temperature increase.

Using a strain gauge connected to the blade allows similar measurements and arrangements as for a pressure sensor 3.

For most cutting applications, which are repeated very often, characteristics of movements of the utility knife 1 as a whole can be determined, allowing other types of sensors to be used to indicate the use of the blade indirectly. For example the speed and or acceleration/deceleration during a cut, or vibrations of the knife occurring due to adhesion or sticking of the blade to the material being cut, or even the alignment and/or change of orientation of the knife relative to a predefined coordinate system, can be good indicators of how the blade is being used. To record these parameters gyroscopes, acceleration- and vibration sensors can be used.

Finally for some applications, the sound of the blade moving through the material being cut, or the difference of the amount of light available and/or the color of the material being cut can be recorded by a microphone and/or camera, allowing collection of further data directly related to the use of the blade.

The various values collected by the different types of sensors can be categorized into quantitative and qualitative values recorded over time. In a very basic embodiment, a sensor 3 records use of blade at a certain point in time followed by the absence of the use of the blade, which can be collected as a simple number indicating the number of uses or cuts performed with the blade. Another embodiment allows the recording of a time series at a certain interval (seconds, milliseconds, etc.) indicating if the blade is in use or not. Using this information, the duration of a cut can be determined as further data to be collected. Finally, if the measurement is quantitative, a time series of varying values can be captured allowing integration of the values to a single use value not only over time but also by e.g. force used or temperature of the blade.

In a further embodiment, several sensors can be combined and the collected data can be collected individually or correlated to provide more accurate and detailed information about how the blade is being used the type of use of the blade.

Figure 3:
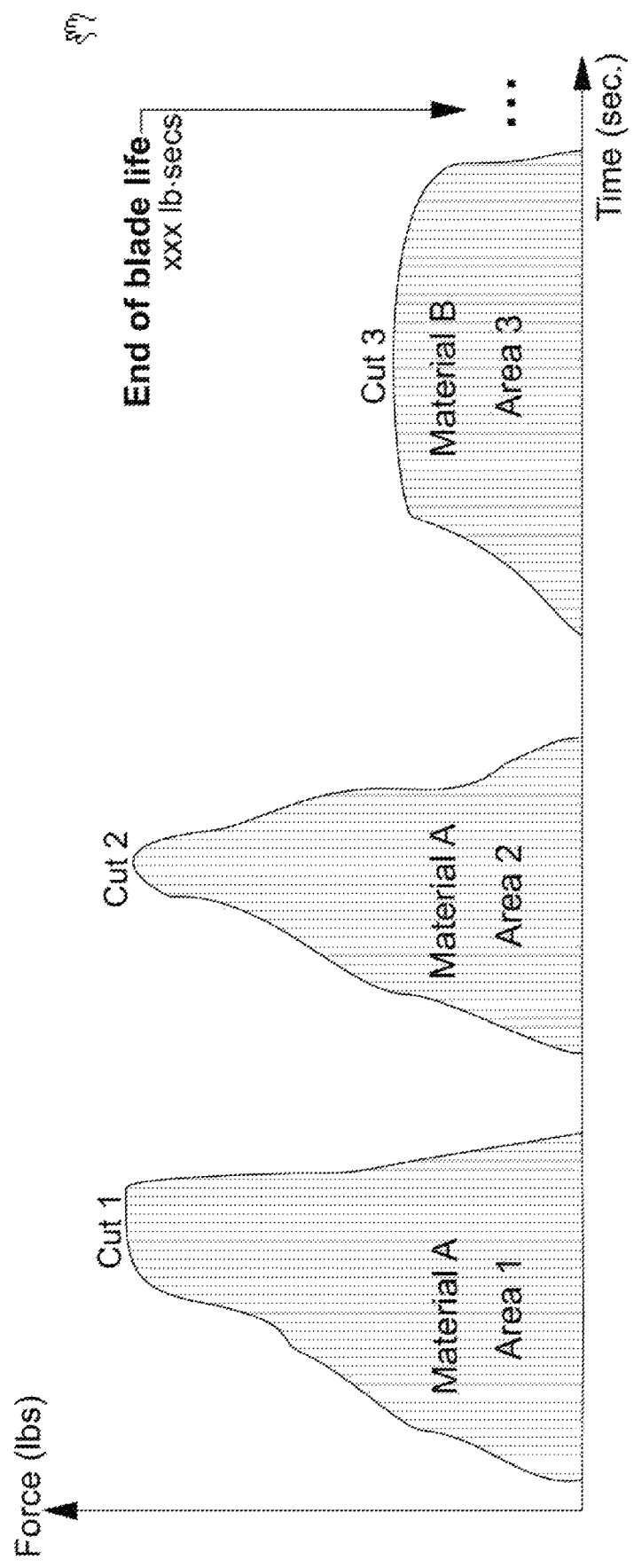

In a preferred embodiment of the invention, a pressure sensor 3 is used to measure the force applied to the blade over time, shown as a force-time graph in FIG. 3. Each cut is associated with an area under the curve of varying size and width, which can be integrated to a lb-secs value that can be correlated to the End of Life of the blade. Depending on the type of material, the force required to make the cut varies, e.g. a hard material A requires more force than a soft material B.

For the current embodiment of the knife, it is foreseen, that the communication unit 4 sends the values recorded by the sensor 3 (or sensors) to a computer cloud network 5, by any kind of wireless transmission. Preferably the transmission is by Bluetooth Low Energy (BLE) to a transmission gateway. However depending on the circumstances, wireless induction or infrared systems and-or WiFi connections may also be used.

In a further embodiment of the invention, the utility knife 1 includes an internal memory and a CPU. The CPU records the values obtained by the sensor 3 and stores these values into the memory as a time series. This allows transmission of the usage information at a later point in time as opposed to a continuous transmission in real time, depending on the reliability of the wireless transmission network, which is required to enable transmission without any interruptions or loss of quality.

Figure 4:
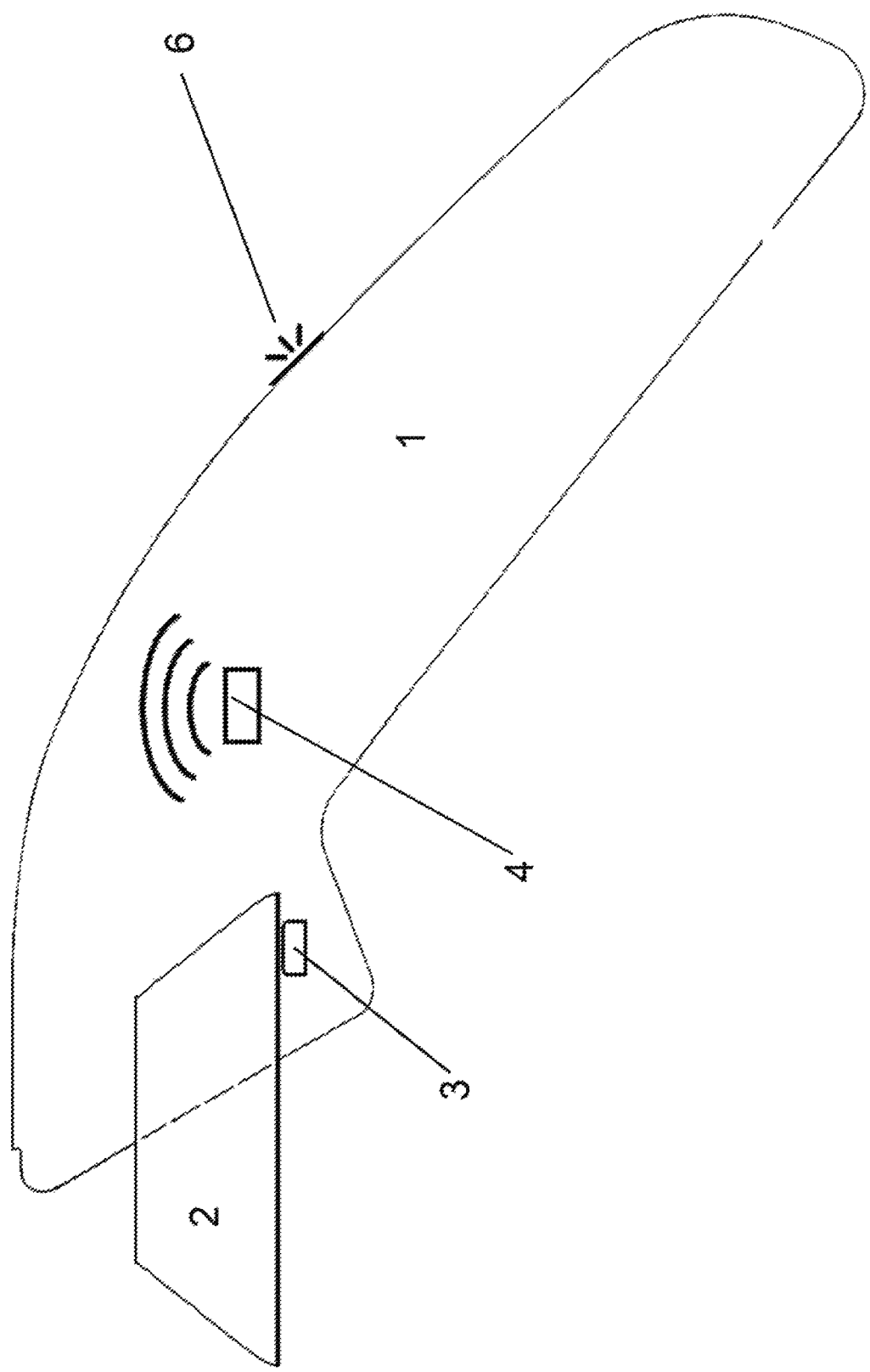

The CPU and the memory enable additional capabilities of the utility knife 1 allowing for a wider area of applications. In many circumstances, excessive force or use on an unsuitable object to be cut, may lead to the immediate End of Life of a blade. To detect this over-straining of the blade, a reference value can be stored in the memory, which indicates a threshold value beyond which the blade is considered broken or unusable and has reached the End of Life. For example, in the embodiment with a pressure sensor 3, the CPU compares the current force value obtained from the sensor 3 to the reference value and creates an alarm if the threshold is met or exceeded. To be able to inform the user of this situation, the utility knife 1 is equipped with an indicator 6 (FIG. 4), which is activated as soon as the alarm status is reached. The indicator 6 can be any kind of optical, acoustic or tactile means which can be easily noticed by the user. In an alternative embodiment, the communication unit 4 sends a signal which is received by a device such as a smart phone, which in turn indicates the alarm.

Under normal conditions the End of Life of the blade occurs over time after many cuts are performed. This End of Life status can also be identified by storing a reference value in the memory for comparison to the current status value of the blade. For this, the CPU stores an updated current status value in the memory each time the sensor 3 is activated by performing a predetermined calculation from the value recorded by the sensor 3 which is then compared to the reference value. In a basic embodiment of the invention, the current status value is the number of cuts performed. Each time the sensor 3 is activated, the CPU adds 1 to the current status value and stores this modified value into the memory. In a more complex embodiment, the actual value recorded by the sensor 3 is added to the previous status value as obtained from the memory, creating an integrated total value of a certain parameter as recorded by the sensor 3. This allows a better determination of the status of the blade, as the duration and length of the cut may have a strong influence on the actual End of Life of the blade.

In a preferred embodiment of the invention, using a pressure sensor 3 further improves the determination of the End of Life of the blade. Materials that are hard to cut require more force and generally lead to greater wear of the blade. By recording the force applied to the blade with a pressure sensor 3, this can be taken into account as a larger force applied leads to a larger increase of the integrated current status value as determined from the area under the curve, which is then stored in the memory. During or after each cut, the current status value is compared to the reference value by the CPU and the alarm status is indicated by a means as described above as soon as the current status value exceeds the reference value.

If the alarm indication is present either on the knife or on a remote device, this can be reset once the blade is replaced with a new blade. In a basic implementation of the invention, the removal of the blade can trigger the reset of the current status value, which in turn will remove the alarm status.

In the preferred embodiment of the invention, the communication unit 4 is adapted to receive a reference value from the computer cloud network 5 via wireless transmission, which is then stored in the memory. It is also foreseen that several reference values for the same parameters such as force, temperature or several different parameters, can be stored into the memory. This is especially useful if the utility knife 1 is equipped with several different sensors.

In a further embodiment, the utility knife 1 is equipped with a pressure and a temperature sensor 3. While the integrated values of the force over time as recorded by the pressure sensor 3 can give a good indication of the End of Life due to dullness of the blade, the collected temperature sensor 3 values allow a determination of the number of times a critical temperature is exceeded which could lead to degradation of the blade material. Both status values of the blade can be used independently of each other to determine if the End of Life of the blade is reached. A combination of both values can also be used as the effect of the pressure may be magnified by a higher temperature of the blade. For the calculation of the integrated value in this embodiment, the force value could be weighted depending on the temperature value before being integrated. Other alternative combinations of sensors and their corresponding recorded values can be used to calculate the current status value of the blade to be compared to the reference value reflecting the End of Life of the blade.

In order to reduce the complexity of the operations performed by the CPU on the utility knife 1 and reduce the amount of memory required for storing values, a system for determining the End of Life of the blade can include an external control system with a control CPU and a control memory adapted to receive, store and process information from the communication unit 4 via wireless transmission. In this embodiment, the data collected by the sensors is sent to the control system at predefined intervals, e.g at the end of the hour or day or is initiated by a trigger event such as the passing of the utility knife 1 in the proximity of the control system or the return to a tool station at the end of a shift.

The external control system can also be used to store historical data collected from the utility knife 1. In a preferred embodiment, the utility knife 1 collects data in the form of a time series of the values recorded by the sensors in addition to determining the current status value of the blade. As soon as the blade is replaced, the current data set is sent to and stored by the control system and the memory on the utility knife 1 is reset, allowing collection of a new data set for the new blade.

In one embodiment, the control system comprises a blade dispensing station with new replacement blades. Upon removal of a new replacement blade from the blade dispensing station, the triggering event initiates the restart of data transmission from the utility knife 1 to the control system. Using this system, a data set of the recorded parameters can be stored for each blade for future use and data analysis In a preferred embodiment this data analysis uses machine learning and/or artificial intelligence to determine common or similar values of recorded parameters or of values calculated from recorded parameters according to a predefined logic, which can be used as reference values indicating the End of Life of a blade.

An exemplary method for determining the End of Life of the replaceable blade 2 using the described system comprising the utility knife 1 and the control system stores each information set received from the utility knife 1 in the control memory as an additional data set. This allows the control CPU to perform mathematical operations on the historically collected data. As a first step an average, a maximum and a minimum value is calculated from the stored values for the same parameter. Optionally the highest and lowest stored values can be omitted for this calculation to prevent runaway values from disproportionately affecting the results. Depending on the field of application, one of these average, maximum or minimum values, or any other value calculated empirically from the stored values is then sent to the communication unit 4 of the utility knife 1 as a new reference value for indicating the End of Life of the replaceable blade 2. Using this method and taking into account other relevant conditions such as the user of the utility knife 1, the task performed, the blade type used, the environment temperature, altitude, humidity and/or cleanliness one or several reference values can be determined using artificial intelligence (AI) assisting the user in determination of the optimal point in time when the blade should be replaced for maximum efficiency and/or injury prevention.

Figure 5A:
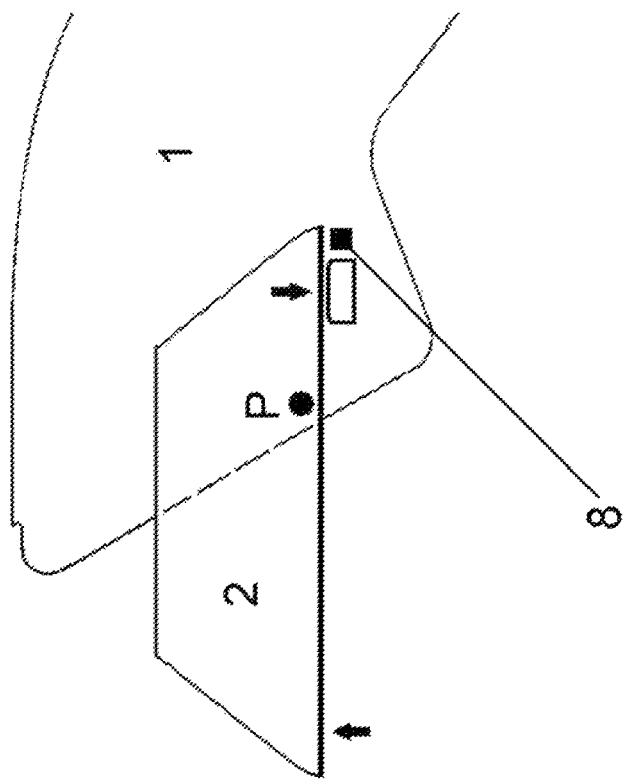
Figure 5B:
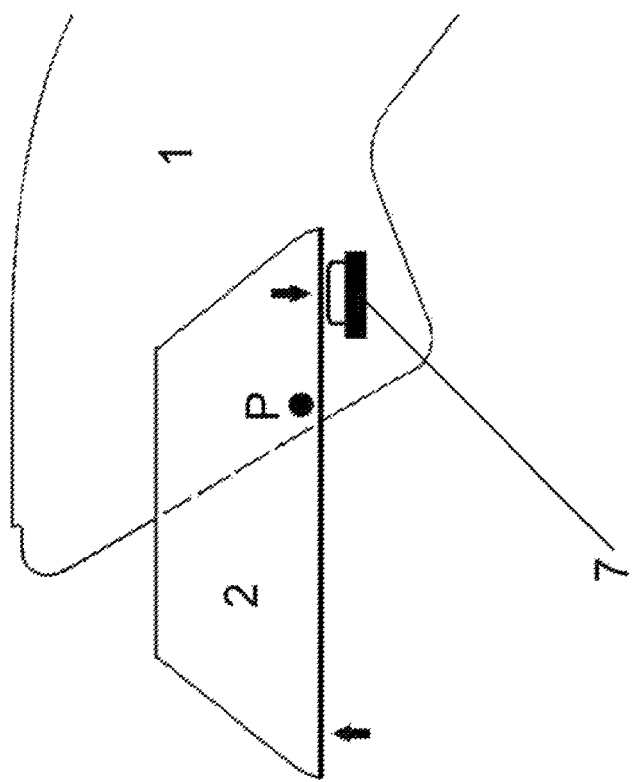

In one possible embodiment of the invention, the utility knife 1 is equipped with replaceable blade 2 which pivots around a point P close to the center of the cutting edge as shown in FIG. 2a, so that any pressure applied to the front part of the cutting edge creates pressure in the opposite direction at the other end of the blade, where a pressure sensor 3 is located. If an excessive amount of pressure is applied, e.g. at the beginning of the cut or when cutting tough materials, the pressure on the pressure sensor 3 can lead to a malfunction, damage or even the destruction of the pressure sensor 3. In order to prevent this, the pressure sensor 3 can be equipped with a damping device 7 (FIG. 5a) to prevent too much pressure from being applied to the pressure sensor 3. The damping device 7 can be made of rubber or be a spring and can be located on the opposite side of the blade or even connected to the blade. In another embodiment, a bulge 8 (FIG. 5b) can be arranged in the vicinity of the pressure sensor 3 preventing the blade from moving too far towards the pressure sensor 3 to avoid the pressure from becoming higher than the limit the pressure sensor 3 is designed to handle.

Figure 6:
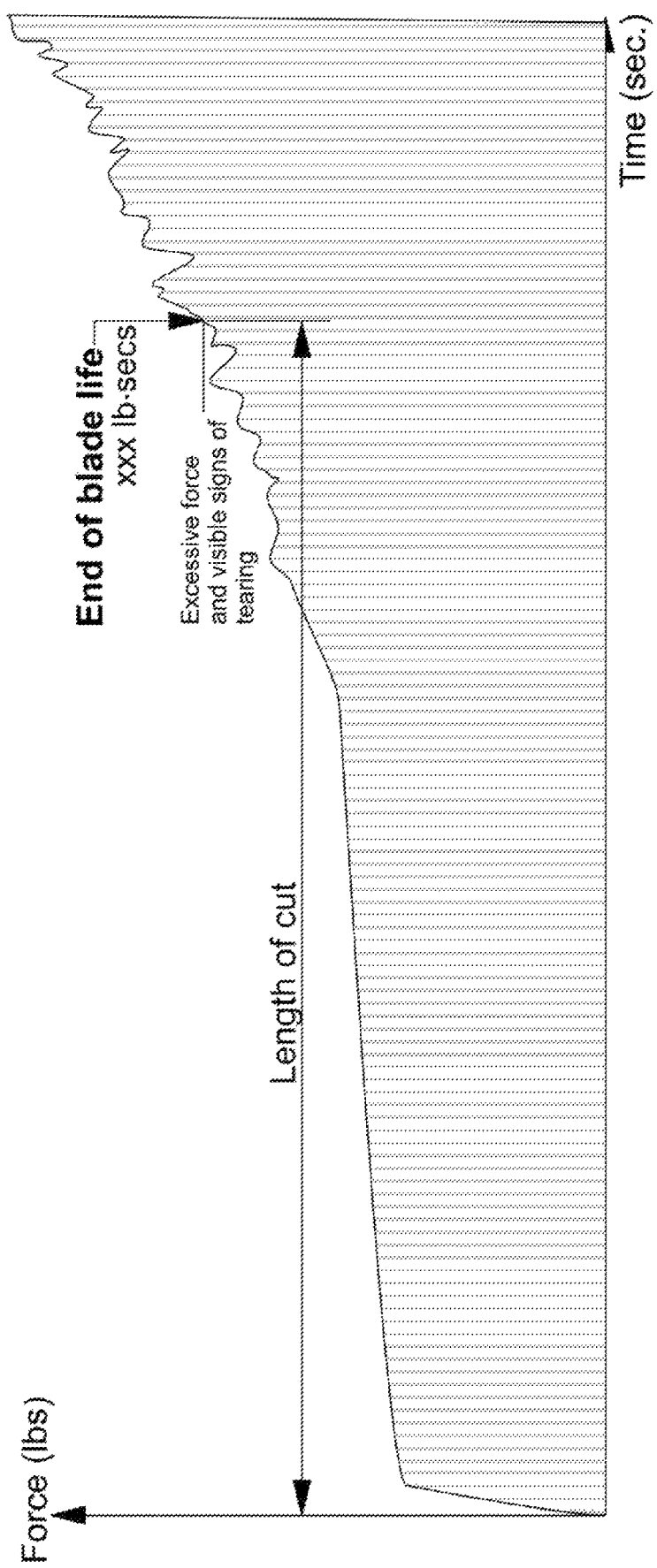

In this embodiment, the force applied to the blade as recorded by the pressure sensor 3 is recorded over time and integrated to a total integrated value of lb-secs (FIG. 6). The reference value for indicating the End of Life of the replaceable blade 2 is set to a predetermined value or obtained using the method described above from the use of the utility knife 1 by an experienced user, replacing the blade as soon as it is determined to have become to dull to perform the cutting with the required efficiency and/or safety for the user.

This description and the accompanying drawings show exemplary embodiments of the invention. The invention, however, should not be interpreted as being limited to these particular embodiments. Variations of the embodiments can be made by those skilled in the art without departing from the scope of this invention as defined by the claims.

The invention claimed is:

1. A hand-operated utility knife for a pulling or pushing cutting action, with an elongated handle, a replaceable blade extending from the elongated handle at a front end thereof, comprising:
one or more sensors for detecting the replaceable blade use, and a communication unit wherein
said communication unit being integrated into the elongated handle, said communication unit adapted to establish a direct wireless connection to a computer cloud network and to send and receive information via wireless transmission, wherein an end of life of the replaceable blade occurs when an integrated total value of force and at least one of time, length and duration of the replaceable blade cuts exceeds a reference value.

2. The utility knife of claim 1, further comprising an internal memory and a CPU, said CPU being adapted to record values obtained by the sensor and storing said values into the memory as a series of values by time.

3. The utility knife of claim 2, wherein said internal memory being adapted to store a reference value (received via communication unit) and said CPU being adapted to compare said reference value with values obtained by the sensor.

4. The utility knife of claim 3, further comprising an indicator, wherein said indicator is activated if said reference value is matched or exceeded by one of said values obtained by the sensor.

5. The utility knife of claim 2, wherein said CPU being adapted to integrate values recorded by the sensor and storing said integrated value into the memory.

6. The utility knife of claim 5, wherein said internal memory being adapted to store a reference value (received via communication unit) and said CPU being adapted to compare said reference value with said integrated value.

7. The utility knife of claim 6, further comprising an indicator, wherein said indicator is activated as soon as said reference value is matched or exceeded by said integrated value.

8. The utility knife of claim 1, wherein an axis of a cutting edge of the replaceable blade is parallel to a lengthwise axis of the elongated handle.

9. System for determining the End of Life of the replaceable blade of the utility knife of claim 1, further comprising a control system with a control CPU and a control memory, adapted to receive, store and process information from the communication unit via wireless transmission.

10. The system of claim 9, wherein said control system records and stores an information set received from the communication unit, said information set being a series of values recorded by said sensor by time, said information set being sent from the communication unit as soon as a trigger event occurs in the proximity of the control system.

11. The system of claim 10, wherein the trigger event is initiated by a sensor detecting the removal of the replaceable blade from the utility knife.

12. The system of claim 10, further comprising a blade dispensing station containing new replacement blades, wherein the trigger event is initiated by a sensor detecting the removal of a new replacement blade from the blade dispensing station.

13. Method for determining the End of Life of the replaceable blade using the system of claim 10, wherein the information set is stored in the control memory as an additional data set, said control CPU calculates an average, a maximum and a minimum value of all stored data sets.

14. The Method of claim 13, wherein the control system sends one of the average, maximum or minimum values to the communication unit as a new reference value.

15. The Method of claim 13, wherein machine learning or artificial intelligence is used for determining common or similar values of recorded parameters in the stored data sets or of values calculated from these parameters according to a predefined logic, for use as reference values.

* * * * *